US011162352B2

(12) United States Patent
Shen et al.

(10) Patent No.: US 11,162,352 B2
(45) Date of Patent: Nov. 2, 2021

(54) DETECTING A SCREEN-OUT IN A WELLBORE USING AN ACOUSTIC SIGNAL

(71) Applicant: Halliburton Energy Services, Inc., Houston, TX (US)

(72) Inventors: Yijie Shen, Houston, TX (US); Jason Edward Therrien, Cypress, TX (US); Mikko Jaaskelainen, Katy, TX (US); Neha Sahdev, Aurora, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 227 days.

(21) Appl. No.: 16/470,330

(22) PCT Filed: Jan. 18, 2017

(86) PCT No.: PCT/US2017/013933
§ 371 (c)(1),
(2) Date: Jun. 17, 2019

(87) PCT Pub. No.: WO2018/136052
PCT Pub. Date: Jul. 26, 2018

(65) Prior Publication Data
US 2019/0323341 A1 Oct. 24, 2019

(51) Int. Cl.
*E21B 43/267* (2006.01)
*E21B 47/06* (2012.01)
(Continued)

(52) U.S. Cl.
CPC .......... *E21B 47/107* (2020.05); *E21B 43/267* (2013.01); *E21B 47/07* (2020.05);
(Continued)

(58) Field of Classification Search
CPC ........ E21B 43/26; E21B 43/267; E21B 47/00; E21B 47/101; E21B 47/065; E21B 47/07;
(Continued)

(56) References Cited

U.S. PATENT DOCUMENTS

| 5,536,115 A | 7/1996 | Keck |
| 8,607,864 B2 | 12/2013 | Mcleod et al. |

(Continued)

FOREIGN PATENT DOCUMENTS

AU  2013340482  2/2015

OTHER PUBLICATIONS

Evans et al., "Eagle Ford Case History: Evaluation of Diversion Techniques to Increase Stimulation Effectiveness", Aug. 2016, 20 pages.

(Continued)

*Primary Examiner* — Daniel P Stephenson
(74) *Attorney, Agent, or Firm* — Kilpatrick Townsend & Stockton LLP

(57) ABSTRACT

Screen-outs can be detected from acoustical signals in a wellbore. Data based on an acoustic signal generated during a hydraulic fracturing operation in a wellbore formed through a subterranean formation can be received. An expected total flow rate of fluid being injected into the wellbore can be determined based on the data. An actual total flow rate of the fluid being injected into the wellbore can be determined. A screen-out that occurred can be identified by comparing the expected total flow rate and the actual total flow rate.

20 Claims, 9 Drawing Sheets

(51) Int. Cl.
  *E21B 47/10* (2012.01)
  *G01V 1/50* (2006.01)
  *E21B 47/107* (2012.01)
  *E21B 47/07* (2012.01)

(52) U.S. Cl.
  CPC ........ *G01V 1/50* (2013.01); *G01V 2210/1429* (2013.01); *G01V 2210/644* (2013.01)

(58) Field of Classification Search
  CPC .......... E21B 47/107; G01V 1/48; G01V 1/50; G01V 2210/1429; G01V 2210/644; G01V 2210/646
  See application file for complete search history.

(56) References Cited

U.S. PATENT DOCUMENTS

| | | |
|---|---|---|
| 2006/0102344 A1 | 5/2006 | Surjaatmadja et al. |
| 2014/0180592 A1 | 6/2014 | Ravi et al. |
| 2016/0097260 A1 | 4/2016 | Tolman et al. |
| 2016/0273346 A1 | 9/2016 | Tang et al. |
| 2019/0323341 A1* | 10/2019 | Shen ........................ E21B 47/00 |
| 2020/0190971 A1* | 6/2020 | Thiruvenkatanathan .................... E21B 47/107 |
| 2020/0200000 A1* | 6/2020 | Langnes ................. E21B 47/00 |
| 2020/0318473 A1* | 10/2020 | Jarvis ...................... E21B 47/07 |
| 2020/0355055 A1* | 11/2020 | Dusterhoft ............ E21B 43/255 |
| 2020/0393585 A1* | 12/2020 | Jaaskelainen .......... G01V 1/288 |

OTHER PUBLICATIONS

Holley et al., "Fiber-Optic Monitoring: Stimulation Results from Unconventional Reservoirs", Jul. 2015, 16 pages.
Massaras et al., "Real-Time Advanced Warning of Screenouts with the Inverse Slope Method", 2012, 8 pages.
International Application No. PCT/US2017/013933, "International Search Report and Written Opinion", dated Sep. 28, 2017, 14 pages.
Stokely, "Acoustics-Based Flow Monitoring During Hydraulic Fracturing", Feb. 2016, 24 pages.

* cited by examiner

DETECTING A SCREEN-OUT IN A WELLBORE USING AN ACOUSTIC SIGNAL

TECHNICAL FIELD

The present disclosure relates generally to hydraulic fracturing in a wellbore and, more particularly (although not exclusively), to detecting a screen-out in a wellbore using an acoustic signal.

BACKGROUND

Fracking can be performed in a well system, such as an oil or gas well for extracting hydrocarbon fluids from a subterranean formation, to increase a flow of the hydrocarbon fluids from the subterranean formation. Hydraulic fracturing can include pumping a treatment fluid that includes a proppant mixture into a wellbore formed through the subterranean formation. The treatment fluid can create perforations in the subterranean formation and the proppant mixture can fill the perforations to prop the perforations open. Propping the perforations open can allow the hydrocarbon fluids to flow from the subterranean formation through the perforations and into the wellbore. In some examples, the wellbore is divided into stages such that each stage includes one or more perforation clusters and each perforation cluster includes one or more perforations. A hydraulic fracturing process can be intended to create uniform perforations within each stage. A screen-out can occur when first perforation fills with proppant before a second perforation in the stage, preventing the treatment fluid from enlarging the first perforation. Screen-outs can result in non-uniform perforations, which can reduce the effectiveness of the hydraulic fracturing process. Once a screen-out is detected and located, different treatment fluids can be pumped into the wellbore at different rates to overcome the screen-out and create more uniform fractures.

DETAILED DESCRIPTION

Figure 1:
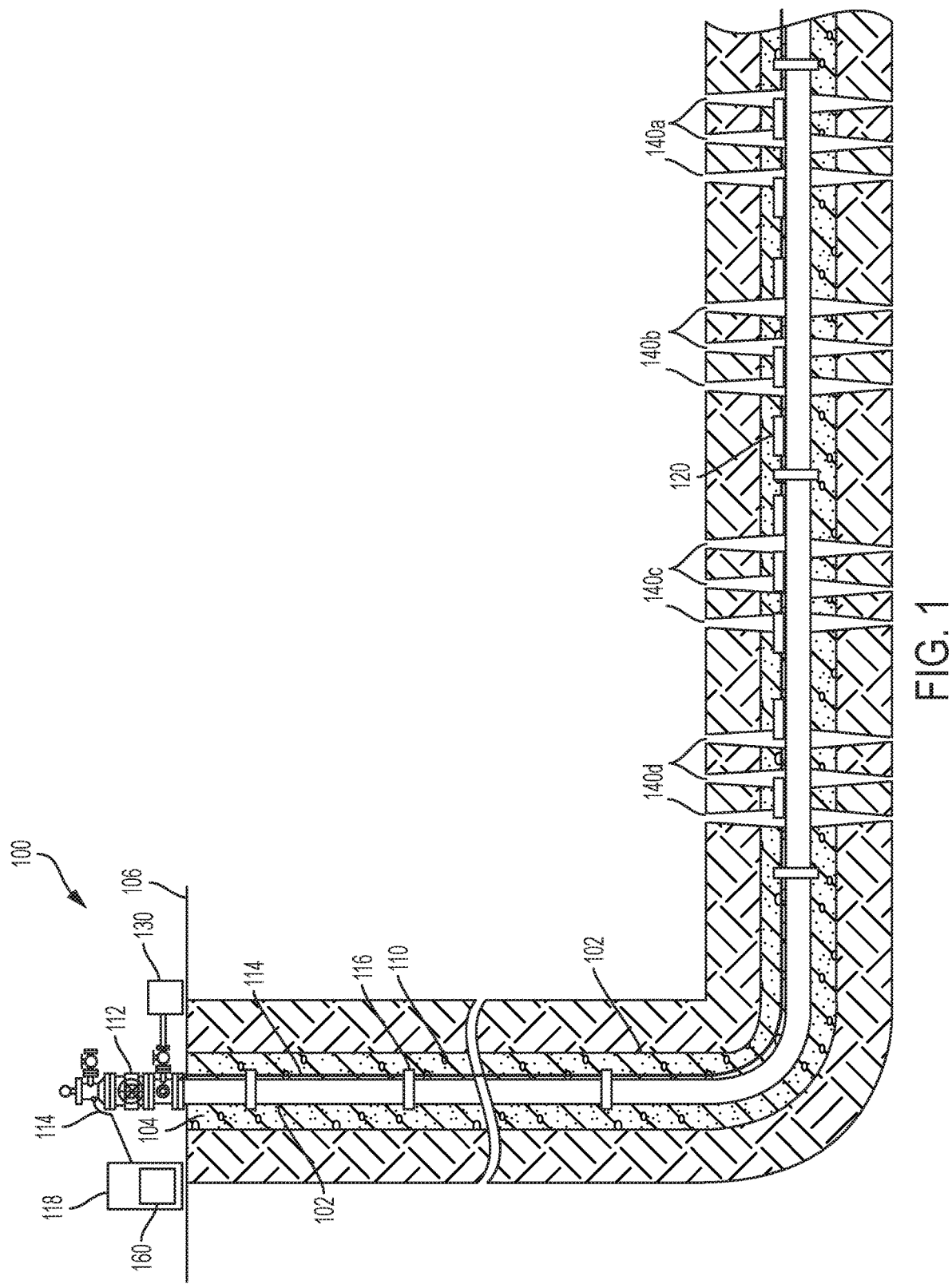
FIG. 1 is a diagram of an example of a well system including a processing device for detecting a screen-out in a wellbore based on an acoustic signal according to one aspect of the present disclosure.

Certain aspects and features of the present disclosure relate to detecting a screen-out in a wellbore using an acoustic signal. A hydraulic fracturing process can include pumping a treatment fluid into a wellbore at a known flow rate to create and enlarge perforations. A distributed acoustic sensing system ("DAS") can measure data about acoustic signals generated by the treatment fluid moving through the perforations. A processing device can determine an expected total flow rate of the treatment fluid injected into the wellbore from the surface based on the measured data. Differences in the actual total flow rate of treatment fluid injected into the wellbore and the expected total flow rate can indicate a screen-out has occurred. In some examples, the processing device can determine an expected flow rate for the treatment fluid through a perforation cluster that includes one or more perforations. The processing device can further determine a screen-out occurred at the perforation cluster based on a change in a slope of the expected flow rate through the perforation cluster.

In some aspects, a DAS may include an interrogation device positioned at a surface proximate to a wellbore and coupled to an optical fiber extending from the surface into the wellbore. An optical source of the interrogation device may transmit an optical signal, or an interrogation signal, downhole into the wellbore through the optical fiber. Backscattering of the optical signal can occur based on the optical signal interacting with the optical fiber and can cause the optical signal to propagate back toward an optical receiver in the interrogation device. In some examples, different backscattering can occur based on acoustic signals causing a vibration in the optical fiber. In additional or alternative examples, thermal signals (e.g., changes in temperature) can cause thermal expansion of the cable and movement or expansion of the optical fiber. The acoustic signals and the thermal signals may have different frequency content. The optical signal can be analyzed to determine real-time data about the acoustic signals including an intensity and location of the acoustic signal or changes in temperature. A DAS can detect acoustic signals anywhere along a length of optical fiber in substantially real time (e.g., real time can be limited by the travel time of the optical pulse from the DAS signal transmitter to the end of the optical fiber and back to the DAS optical receiver). For example, the DAS can measure real-time data about acoustic signals produced by treatment fluid flowing through perforations in the subterranean formation during a hydraulic fracturing process. The real-time data can be used to determine expected flow rates at each perforation cluster in a wellbore as part of a flow model. Determining the flow model during the hydraulic fracturing process can allow for screen-outs to be detected in real-time (e.g., detected substantially contemporaneously as the screen-outs occur).

Screen-outs can have a negative impact on well productivity and reduce the effectiveness of the hydraulic fracturing process. In some examples, a screen-out can be an operational risk by causing a pressure of treatment fluid at a surface of the wellbore to exceed the safety limitations, which can result in a premature termination of the hydraulic fracturing process. Terminating the stimulation treatment prematurely can result in expensive cleanout runs with coiled tubing and a substantial amount of non-productive time. Accurately predicting when and where a screen-out will occur can be difficult because screen-outs can be caused by various downhole conditions. Screen-outs can be a common phenomenon in hydraulic fracturing of wellbores with multiple perforation clusters. In some studies, two-thirds of stages included unstimulated perforation clusters due to screen-outs after a hydraulic fracturing process. Detecting a screen-out and the location of the screen-out early can help reduce the pumping time, decrease the amount of pumping fluid, and maximize oil recovery from a reservoir. For example, a well producing 500 barrels per day may have 20% of the perforation clusters in the well unstimulated due to screen-out. Detecting screen-outs early can allow for uniform stimulation such that the well produces closer to 625 barrels per day, which can increase revenue by more than 2 million dollars per year.

In some existing systems, screen-outs are detected based on changes in a pressure of the treatment fluid at the surface. But, waiting for changes in the pressure at the surface can introduce a delay in detecting the screen-outs and may not indicate the location of the screen-out in the wellbore. Detecting screen-outs using acoustic signals measured by a DAS can allow the screen-outs to be detected and located in real-time, which can allow well operators to respond more quickly and improve the hydraulic fracturing process. A processing device can use the measurements about the acoustic signals to detect screen-outs, in real time, at individual perforation clusters. In some examples, a system can detect screen-outs and a location of the screen-outs early based on acoustic signals detected in real-time by a DAS. Filtered DAS data at different frequency bands can also be used for different purposes. For example, the lower frequency components of DAS data may be more closely related to thermal effects and the higher frequency components may be more closely related to acoustic signals.

This information can empower operators to determine diversion schedules immediately in response to a screen-out and to achieve a uniform and effective flow allocation during a hydraulic fracturing process. In additional or alternative examples, data from detecting and locating the screen-out can be used by the processing device to automatically adjust the hydraulic fracturing process. The processing device can be communicatively coupled to a pump, and the processing device can update a pumping schedule used by the pump based on detecting the screen-out. For example, the processing device can update the pumping schedule to cause the pump to inject a diverter fluid into the wellbore in response to detecting a screen-out.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 illustrates an example of a well system 100 that may include a distributed acoustic sensing system according to some aspects of the present disclosure. The well system 100 includes a casing string 102 positioned in a wellbore 104 that has been formed in a surface 106 of the earth. The well system 100 may have been constructed and completed in any suitable manner, such as by use of a drilling assembly having a drill bit for creating the wellbore 104. The casing string 102 may include tubular casing sections connected by end-to-end couplings. In some aspects, the casing string 102 may be made of a suitable material such as steel. Within the wellbore 104, cement 110 may be injected and allowed to set between an outer surface of the casing string 102 and an inner surface of the wellbore 104.

At the surface 106 of the wellbore 104, a tree assembly 112 may be joined to the casing string 102. The tree assembly 112 may include an assembly of valves, spools, fittings, etc. to direct and control the flow of fluid (e.g., oil, gas, water, etc.) into or out of the wellbore 104 within the casing string 102. For example, a pump 130 can be coupled to the tree assembly 112 for injecting a treatment fluid into the wellbore 104 as part of a hydraulic fracturing process. The treatment fluid can form the perforation clusters 140a-d through the outer surface of the casing string 102, the cement, and a surrounding subterranean formation. Each perforation cluster 140a-d can include one or more fractures and the treatment fluid can include proppant for propping the fractures open such that production fluid can flow from the surrounding subterranean formation into the wellbore 104.

Optical fibers 114 may be routed through one or more ports in the tree assembly 112 and extend along an outer surface of the casing string 102. The optical fibers 114 can include multiple optical fibers. For example, the optical fibers 114 can include one or more single-mode optical fibers and one or more multimode optical fibers. Each of the optical fibers 114 may include one or more optical sensors 120 along the optical fibers 114. The sensors 120 may be deployed in the wellbore 104 and used to sense and transmit measurements of downhole conditions in the well system 100 to the surface 106. For example, the sensors 120 may measure an acoustic signal generated as the treatment fluid from the pump 130 passes through one of the perforation clusters 140a-d. The optical fibers 114 may be retained against the outer surface of the casing string 102 at intervals by coupling bands 116 that extend around the casing string 102. The optical fibers 114 may be retained by at least two of the coupling bands 116. In some aspects, the optical fibers 114 can be positioned exterior to the casing string 102, but other deployment options may also be implemented. For example, the optical fibers 114 can be coupled to a wireline or coiled tubing that can be positioned in an inner area of the casing string 102. The optical fibers 114 can be coupled to the wireline or coiled tubing such that the optical fibers 114 are removable with the wireline or coiled tubing.

The optical fibers 114 can be coupled to an interrogation subsystem 118 of a distributed acoustic sensing system. The interrogation subsystem 118 is positioned at the surface 106 of the wellbore 104. In some aspects, the interrogation subsystem 118 may be an opto-electronic unit that may include devices and components to interrogate sensors 120 coupled to the optical fibers 114. For example, the interrogation subsystem 118 may include an optical source, such as a laser device, that can generate optical signals to be transmitted through one or more of the optical fibers 114 to the sensors 120 in the wellbore 104. The interrogation subsystem 118 may also include an optical receiver to receive and perform interferometric measurements of backscattered optical signals from the sensors 120 coupled to the optical fibers 114.

Although FIG. 1 depicts the optical fibers 114 as being coupled to the sensors 120, the optical fibers 114 can form a distributed acoustic sensing optical fiber and operate as a sensor. A distributed acoustic sensing optical fiber can be remotely interrogated by transmitting an optical signal downhole through the optical fibers 114. In some examples, Rayleigh scattering from random variations of a refractive index in the optical waveguide can produce backscattered light. By measuring a difference in an optical phase of the scattering occurring at two locations along the optical fibers 114 and tracking changes in the phase difference over time, a virtual vibration sensor can be formed in the region between the two scattering location. By sampling the backscattered optical signals at a high rate (e.g., 100 MHz) the optical fibers 114 can be partitioned into an array of acoustic sensors.

In this example, the interrogation subsystem 118 includes a processing device 160 for detecting a screen-out based on an acoustic signal. In additional or alternative examples, a processing device for detecting a screen-out using an acoustic signal can be separate from, but communicatively coupled to, the interrogation subsystem 118. For example, a processing device can be included in a pump. The sensors 120 can measure acoustic signals generated by the treatment fluid passing through the perforation clusters 140a-d and provide optical signals based on the acoustic signals to the interrogation subsystem 118. The processing device 160 can use the optical signals to determine an expected total flow rate of the treatment fluid into the wellbore 104. In additional or alternative examples, the processing device 160 can be communicatively coupled to the pump 130. The pump 130 can communicate the actual total flow rate of treatment fluid being pumped into the wellbore 104 to the processing device 160. The processing device 160 can detect a screen-out in real time based on comparing the actual total flow rate and the expected total flow rate. The processing device 160 can determine the perforation cluster 140a at which the screen-out has occurred based on a change in a slope of a flow rate of the treatment fluid through the perforation cluster 140a.

In some aspects, the sensing system 100 can include one or more electrical sensors deployed using an electrical cable deployed similarly to the optical cable 114. In additional or alternative aspects, the cable 114 can be a hybrid optoelectrical cable housing both optical fibers and electrical conductors for electrical sensors.

Figure 2:
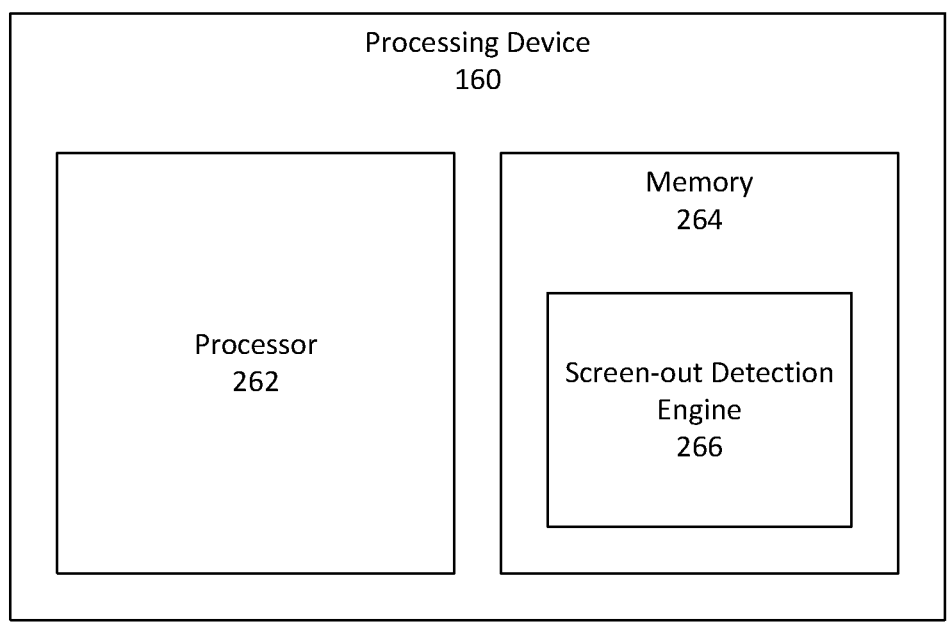
FIG. 2 is a block diagram of a processing device for detecting a screen-out in a wellbore using an acoustic signal according to one aspect of the present disclosure.

FIG. 2 depicts an example of the processing device 160 in FIG. 1. The processing device 160 can include any number of processors 262 configured for executing program code stored in memory 224. Examples of the processing device 160 can include a microprocessor, an application-specific integrated circuit ("ASIC"), a field-programmable gate array ("FPGA"), or other suitable processor. In some aspects, the processing device 160 can be a dedicated processing device used for detecting a screen-out based on an acoustic signal. In additional or alternative aspects, the processing device 160 can perform function in addition to detecting a screen-out based on an acoustic signal. For example, the processing device 160 can determine a pumping schedule for a hydraulic fracturing process and communicate with a pump to perform the operation.

The processing device 160 can include (or be communicatively coupled with) a non-transitory computer-readable memory 264. The memory 264 can include one or more memory device that can store program instructions. The program instructions can include for example, a screen-out detection engine 266 that is executable by the processing device 160 to perform certain operations described herein.

The operations can include detecting and locating a screen-out in real time based on an acoustic signal. For example, the instructions can be executed by the processing device 160 for causing the processing device 160 to receive data based on an acoustic signal generated in the wellbore 104 during a hydraulic fracturing operation. The acoustic signal can have been generated by treatment fluid flowing through a specific perforation, or perforation clusters 140a-d, in a subterranean formation. The instructions can further cause the processing device 160 to determine flow rates of the treatment fluid through the perforation based on the data. The instructions can further cause the processing device to determine that a screen-out occurred at the perforation based on a change in the slope of the flow rates of the fluid through the perforation. The change in the slope can be a change from a positive slope to a negative slope and the difference in the magnitude of the positive slope and the negative slope can exceed a threshold value.

The operations can further include calibrating the threshold value such that the processing device accurately detects screen-outs. For example, the instructions can be executable by the processing device for causing the processing device to detect one or more additional screen-outs at a perforation using a distributed temperature sensing system ("DTS"). The instructions can further cause the processing device to determine the threshold value based on a change in slope of the flow rate at the perforation during the one or more additional screen-outs.

Figure 3:
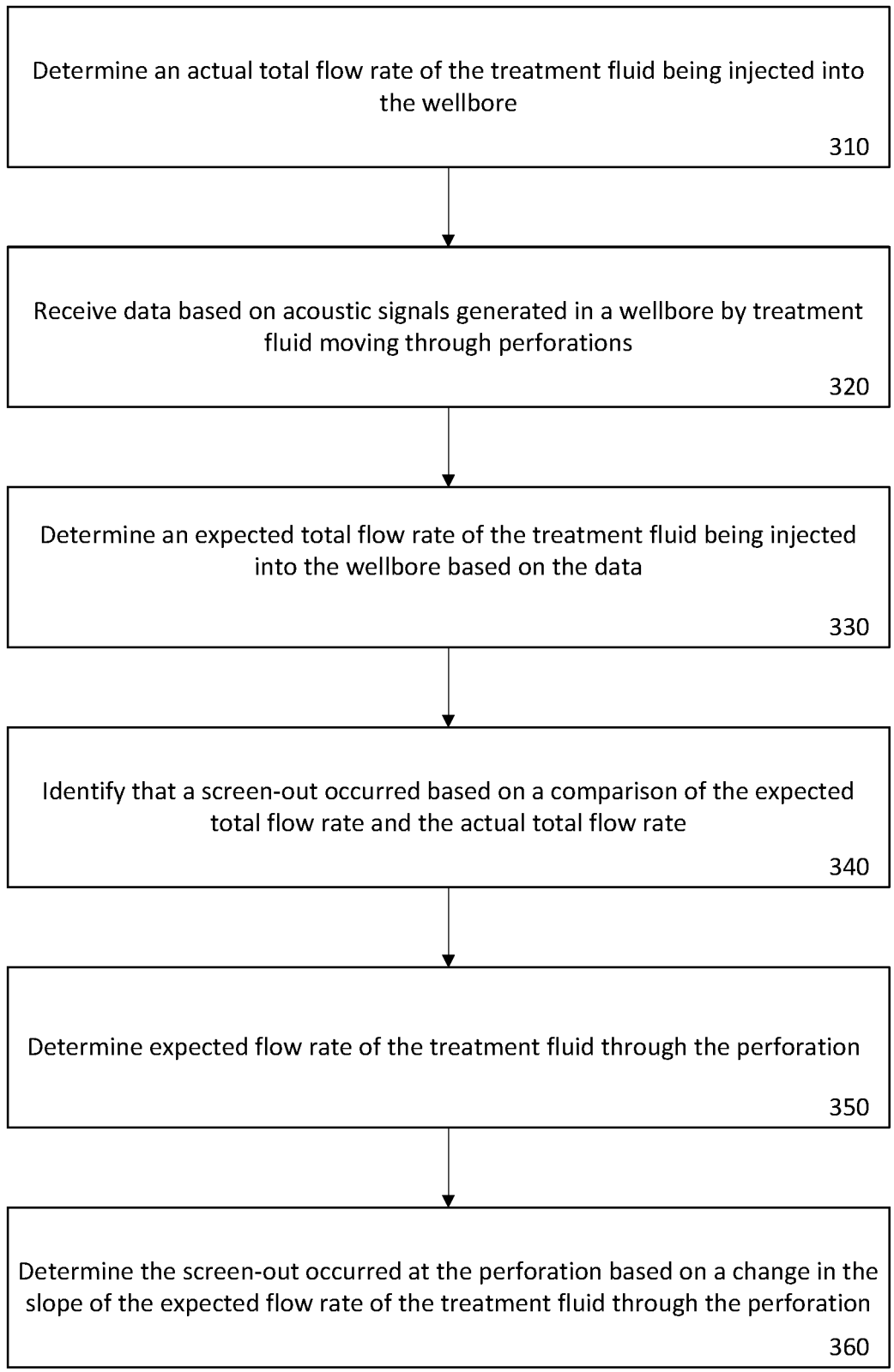
FIG. 3 is a flowchart of a process for detecting a screen-out in a wellbore using an acoustic signal according to one aspect of the present disclosure.

FIG. 3 depicts a process for detecting and locating a screen-out based on acoustic signals. The process as described below is performed by the processing device 160 in FIGS. 1-2, but other implementations are possible.

In block 310, an actual total flow rate of the treatment fluid being injected into the wellbore 104 is determined by the processing device 160. In some aspects, the processing device 160 is communicatively coupled to (or included in) the pump 130 for receiving the actual flow rate of the treatment fluid being injected into the wellbore 104. The pump 130 can follow a pumping schedule that indicates a type and amount of treatment fluid to inject into the wellbore 104. The pump 130 can transmit a signal to the processing device 160 including the pumping schedule or the amount of treatment fluid being injected into the wellbore 104.

In additional or alternative aspects, the processing device 160 can determine the actual total flow rate based on a sensor at or near the surface 106 (e.g., closer to the surface 106 than the perforation clusters 140a-d) of the wellbore 104. In some examples, the sensor can be an electromagnetic transceiver for generating an electromagnetic field and measuring an amount of conductive material in the treatment fluid as the treatment fluid passes through the electromagnetic field. The processing device 160 can use a density of the conductive material in the treatment fluid and the measured amount of conductive material to determine the actual total flow rate of the treatment fluid being injected into the wellbore 104. In additional or alternative examples, the sensor can be part of the DAS and measure data based on acoustic signals generated by the treatment fluid flowing into the wellbore 104. The processing device 160 can determine the total flow rate of the treatment fluid being injected into the wellbore 104 based on the surface data.

In block 320, data based on acoustic signals generated in the wellbore 104 by treatment fluid moving through perforation clusters 140a-d is received at the processing device 160. In some examples, the processing device can receive the data from the interrogation subsystem 118 of the DAS. The DAS can transmit optical signals along the optical fiber 114 to interrogate sensors 120, which measure data about the acoustic signals. The data can include acoustic intensity measurements.

Figure 4:
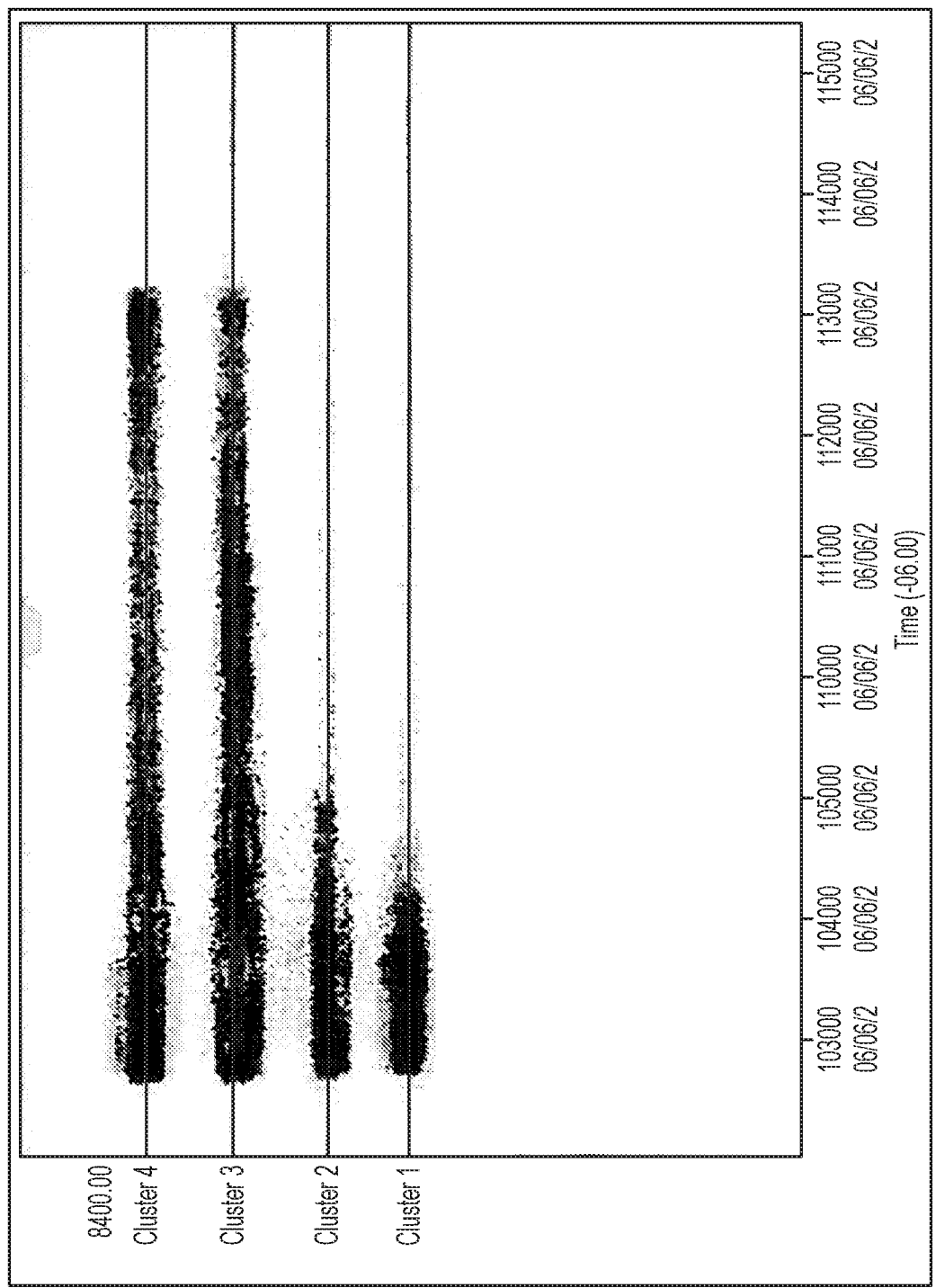
FIG. 4 is a diagram of an example of acoustic intensity data for perforation clusters in a well system during a hydraulic fracturing process according to one aspect of the present disclosure.

FIG. 4 illustrates an example of acoustic intensity data measured by a DAS for a stage with four different perforation clusters (Cluster 1, Cluster 2, Cluster 3, and Cluster 4) during a hydraulic fracturing process. The acoustic intensity data is highest for the perforation clusters at the beginning of the hydraulic fracturing process as fluid enters reservoir locations through each of the perforation clusters. As the proppant starts to be positioned into the perforations, the value of the acoustic intensity data can be reduced due, for example, to erosion of a perforation opening. The value of the acoustic intensity data can be reduced to zero as a screen-out prevents treatment fluid from passing through the perforation or as treatment fluid stops being injected into the wellbore 104. Although FIG. 4 illustrates acoustic intensity data for an entire hydraulic fracturing process, the processing device 160 can receive real-time acoustic intensity information for each of the perforation clusters.

In block 330 of FIG. 3, an expected total flow rate of the treatment fluid being injected into the wellbore is determined by the processing device 160 based on the acoustic intensity data. In some examples, the expected total flow rate is calculated by the processing device 160 based on a regression between the actual total flow rate and the acoustic intensity data. The processing device 160 can use the actual total flow rate to initially allocate a flow rate to each of the perforation clusters 140a-d. In some aspects, perforation clusters 140a-d closer to a toe of the wellbore can be given a lower flow allocation than perforation clusters 140a-d closer to the heel of the wellbore. The processing device 160 can monitor changes in the acoustic intensity at each of the perforation clusters 140a-d and use the changes in the acoustic intensity to determine the expected total flow rate in real time.

Figure 5:
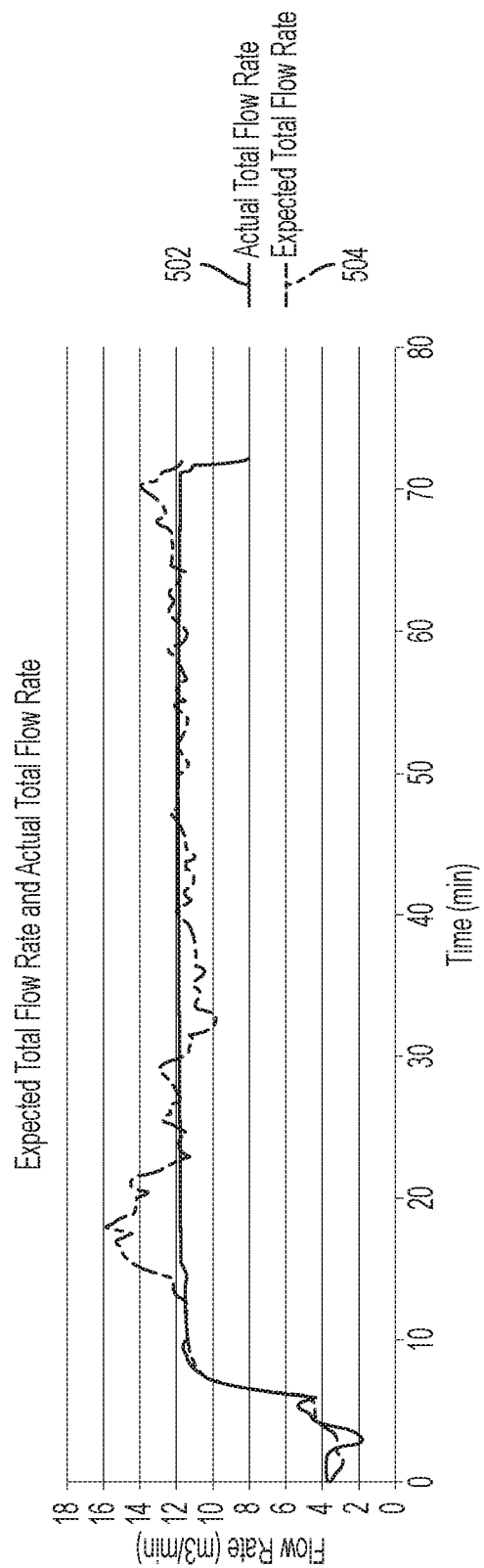
FIG. 5 is a diagram of an example of an expected total flow rate of treatment fluid during a hydraulic fracturing process compared to an actual total flow rate for the treatment fluid according to one aspect of the present disclosure.

In block 340, the processing device 160 identifies that a screen-out occurred based on a comparison of the expected total flow rate and the actual total flow rate. FIG. 5 is a graph illustrating an actual total flow rate 502 and an expected total flow rate 504 during the hydraulic fracturing process associated with FIG. 4. The processing device can identify a screen-out occurred at approximately twenty minutes into the hydraulic fracturing operation by observing a significant (e.g., thirty-percent) overestimation in the expected total flow rate in relation to the actual total flow rate. Although FIG. 5 depicts flow rates during the entire hydraulic fracturing operation, the processing device 160 can compare the expected total flow rate 504 and the actual total flow rate 502 in real time to identify screen-outs in real time, or at substantially the same time that the screen-outs occur.

In block 350 of FIG. 3, the processing device 160 determines an expected flow rate of the treatment fluid through a perforation cluster 140a. The processing device 160 can use the acoustic intensity data about an acoustic signal generated by the treatment fluid passing through the perforation cluster 140a to determine the flow rate of the treatment fluid. In some aspects, the processing device 160 stores a previous acoustic intensity value and an associated previous flow rate in a database or in the memory 164. The processing device can determine the expected flow rate by adjusting the previous flow rate based on a difference between the previous acoustic intensity value and a current acoustic intensity value. In additional or alternative aspects, the processing device 160 can determine the expected flow rate based on the current acoustic intensity value and characteristics of the perforation cluster (e.g., size of perforation opening).

Figure 6:
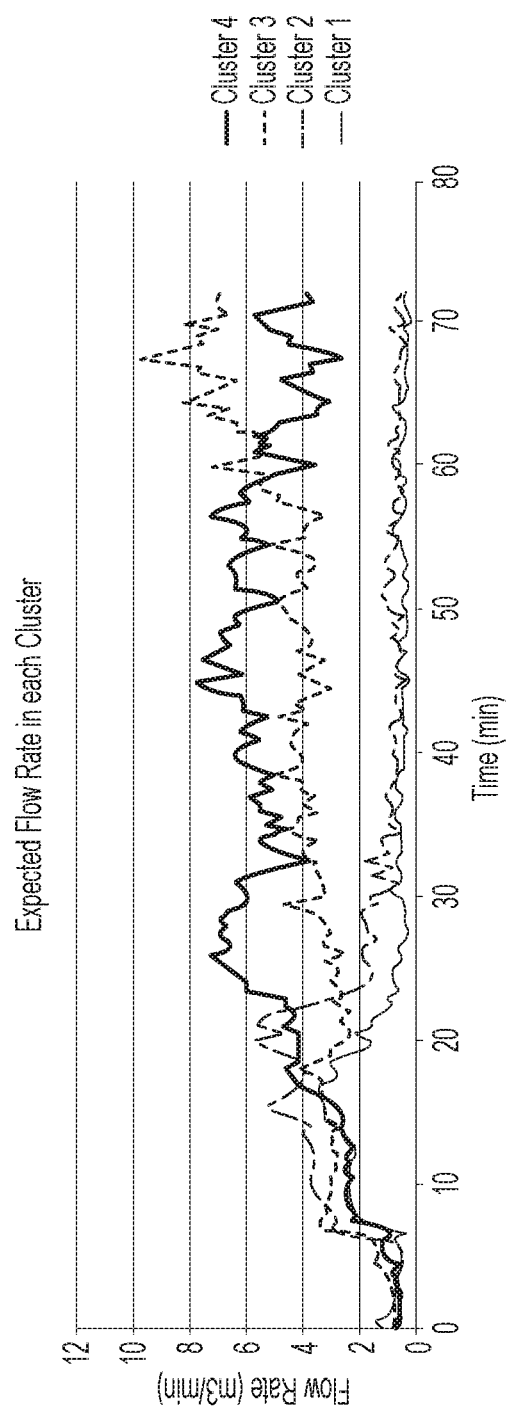
FIG. 6 is a diagram of an example of an expected flow rate for each perforation cluster in a well system according to one aspect of the present disclosure.

FIG. 6 indicates an expected flow rate in Cluster 1, Cluster 2, Cluster 3, and Cluster 4 of FIG. 4. The processing device 160 can determine the expected flow rates in FIG. 6 based on the acoustic intensity data in FIG. 4. For example, as the acoustic intensity for Cluster 1 and Cluster 2 decreases in FIG. 4 (at approximately twenty minutes after the start of the hydraulic fracturing process), the processing device determines the expected flow rate for Cluster 1 and Cluster 2 decreases. Although FIG. 6 illustrates expected flow rates for an entire hydraulic fracturing process, the processing device 160 can determine expected flow rates for each cluster in real-time.

In block 360 of FIG. 3, the processing device 160 determines that the screen-out occurred at a perforation cluster based on a change in the slope of the expected flow rates of the treatment fluid through the perforation cluster. In some examples, the slope of an expected flow rate can change from positive to negative as a screen-out occurs and less treatment fluid begins to pass through the perforation cluster. The processing device 160 can store a previous expected flow rate in a database or in the memory 164 and compare a current expected flow rate with the previous flow rate to determine if the change in slope is negative. In additional or alternative examples, the processing device 160 can store more than one previous expected flow rate and compare a change in slope of the flow rate over more than one expected flow rate.

Figure 7:
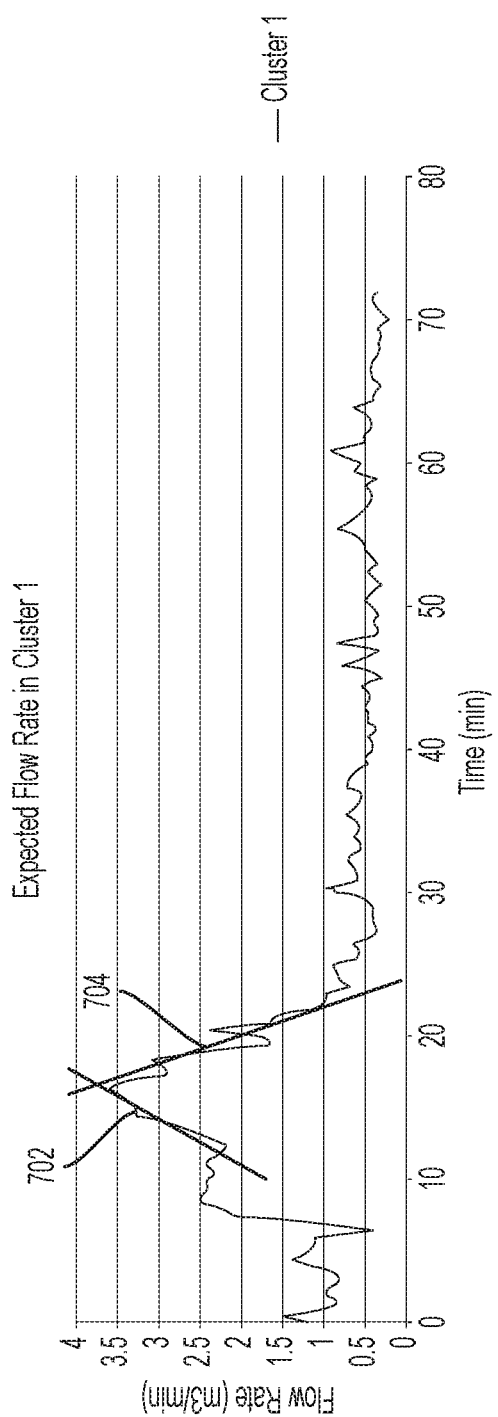
FIG. 7 is a diagram of an example of an expected flow rate for a perforation cluster in a well system according to one aspect of the present disclosure.

FIG. 7 illustrates a positive slope 702 and a negative slope 704 for the expected flow rate of Cluster 1. The positive slope 702 can be the average slope over one or more expected flow rates and the negative slope 704 can be the average slope over one or more subsequent expected flow rates. The processing device 160 can determine that a screen-out occurred based on the change in positive slope 702 and the negative slope 706. In some aspects, the processing device 160 can determine a screen-out has occurred if the change in slope exceeds a threshold value. The threshold value can be set to avoid misidentifying small changes in the slope as screen-outs. In some examples, small changes in the slope of the expected flow rate can be caused by noise. In additional or alternative examples, small changes in the slope of the expected flow rate can be caused by the pump 130 or erosion of an opening of the perforation cluster. In FIG. 7, the magnitude of the negative slope 704 is not equal to the magnitude of the positive slope 702. As the negative slope 704 starts to deviate from the positive slope 702, the perforation cluster can start to screen-out.

The change in slope in FIG. 7 occurs at approximately the same time as the screen-out identified by the processing device based on comparing the expected total flow rate and the actual total flow rate in FIG. 5. In some aspects, the processing device 160 determines the slope of the expected flow rates for the perforation cluster in response to determining that a screen-out has occurred by comparing the actual total flow rate and the expected total flow rate. In additional or alternative aspects, the processing device 160 may determine a screen-out has occurred without calculating the expected total flow rate by observing the change in the slope of the expected flow rate of the perforation cluster where the screen-out occurs.

Figure 8:
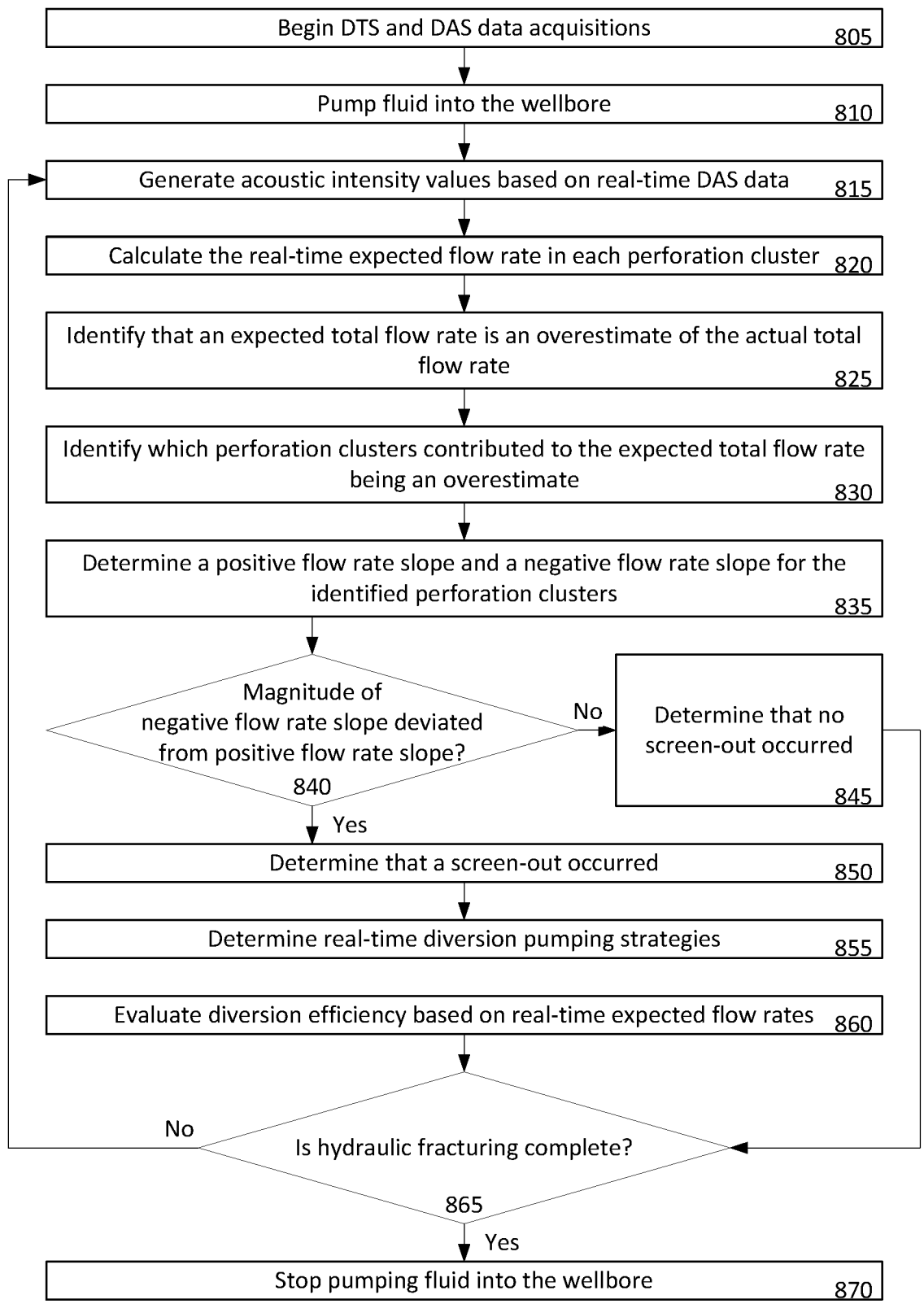
FIG. 8 is a flowchart of a hydraulic fracturing process that includes detecting screen-outs in a wellbore in real time based on acoustic signals.

FIG. 8 depicts a hydraulic fracturing process that includes detecting screen-outs in real time based on acoustic signals. Detecting screen-outs in real time during a hydraulic fracturing process can allow for uniform fractures by executing diversion strategies in real time. The process as described below is performed by the well system 100 in FIG. 1, but other implementations are possible.

In block 805, a DTS and a DAS begin data acquisitions. In some examples, the DTS and DAS share optical fiber 114 and interrogation subsystem 118. The processing device 160 instructs an optical source in the interrogation subsystem 118 to transmit optical signals into the optical fiber 114. Backscattered optical signals are generated by the sensors 120 based on wellbore conditions (e.g., a temperature of a perforation cluster 140*a* or an acoustic signal generated by fluid flowing through the perforation cluster 140*a*) and transmitted toward the surface 106 of the wellbore 104 in response to receiving the optical signals. An optical receiver in the interrogation subsystem 118 can receive the backscattered optical signal and communicate data based on the wellbore conditions to the processing device 160.

In block 810, the pump 130 begins pumping treatment fluid into the wellbore 104. The treatment fluid can be a mixture that includes a proppant for creating fractures in the subterranean formation through which the wellbore 104 is formed. The pump 130 can pump the treatment fluid into the wellbore 104 at an actual total flow rate that can be predetermined or varied based on signals from the processing device 160.

In block 815, the processing device 160 generates acoustic intensity values based on the real-time DAS data. In some examples, the processing device 160 generates the acoustic intensity values by observing changes in the backscattered optical signals generated based on acoustic signals in the wellbore.

In block 820, the processing device 160 calculates a real-time expected flow rate of treatment fluid passing through each perforation cluster 140*a-d*. The real-time expected flow rate can be calculated based on the acoustic intensity values. For example, the processing device 160 can calculate the real-time expected flow rate of treatment fluid passing through perforation cluster 140*a* by comparing previous acoustic intensity values associated with the perforation cluster 140*a* with a current acoustic intensity value associated with the perforation cluster 140. A difference in the magnitude of the current acoustic intensity value and previous acoustic intensity values can be used to calculate a change in the current expected flow rate for the perforation cluster 140*a* from a previous expected flow rate for the perforation cluster 140*a*.

In block 825, the processing device 160 can identify an overestimate of an expected total flow rate compared to an actual total flow rate. The expected total flow rate can be determined based on combining the expected flow rate for each of the perforation clusters 140*a-d*. An overestimate of the expected total flow rate can be a substantially real-time indicator that a screen-out is occurring.

In block 830, the perforation clusters that contributed to the overestimate are identified. The processing device 160 can identify the perforation clusters that contributed to the overestimate based on a spike in expected flow rate for the perforation clusters at approximately the same time as the overestimate. The processing device 160 can determine a spike occurred by detecting a change in a slope of the expected flow rate from a positive slope to a negative slope.

In block 835, a positive flow rate slope and a negative flow rate slope are determined for the identified perforation clusters. The positive flow rate slope and negative flow rate slope can be determined based on more than two expected flow rate values for the identified perforation clusters. In some examples, the positive flow rate slope and the negative flow rate slope are an average of slopes of the expected flow rate prior to a time of the overestimate and an average of slopes of the expected flow rate after the overestimate.

In block 840, the magnitude of the negative flow rate slope is compared to the magnitude of the positive flow rate slope. If the magnitude of the negative flow rate slope is determined to not deviate from the positive flow rate slope then the process continues to block 845. In block 845, the processing device 160 determines that no screen-out has occurred and the process continues to block 865 to determine if the hydraulic fracturing process is complete. But, if the magnitude of the negative flow rate is determined in block 840 to deviate from the positive flow rate slope the process continues to block 850. In block 850, the processing device 160 determines that a screen-out has occurred and the process continues to block 855. In some examples, the processing device 160 can determine if the magnitude of the negative flow rate slope deviates from the positive flow rate slope by comparing a difference in the slopes to a threshold value. If the difference exceeds the threshold value, the magnitude of the negative flow rate slope is determined by the processing device 160 to deviate from the magnitude of the positive flow rate slope. The threshold value can be predetermined or the threshold value can be determined based on changes in the expected flow rate at perforation clusters previously determined to have a screen-out.

In block 855, the processing device 160 determines real-time diversion pumping strategies. The processing device 160 can determine to pump a diverter fluid or treatment fluid at a different actual total flow rate based on determining that a screen-out occurred. Diverter fluid can temporarily obstruct the perforation clusters that are accepting fluid such that treatment fluid at a higher pressure can be pumped into perforation clusters that have a screen-out. Pumping treatment fluid at a higher pressure can overcome a screen-out and enlarge the perforations or fractures included at a perforation cluster that has a screen-out.

In block 860, the processing device 160 evaluates diversion efficiency based on real-time expected flow rates. The processing device 160 can monitor the expected flow rates at the perforation clusters to determine if the diversion pumping strategy is causing more treatment fluid to enter perforation clusters that had a screen-out.

In block 865, the processing device 160 determines if the hydraulic fracturing process is complete. In some examples, the hydraulic fracturing process can be determined to be completed after a predetermined amount of time or a predetermined amount of treatment fluid has been pumped into the wellbore 104. In additional or alternative examples, the hydraulic fracturing process can be determined to be complete based on the fractures formed. The process can return to block 815 and monitor for additional screen-outs if the hydraulic fracturing process is determined to be incomplete. But, the process can continue to block 870 if the hydraulic process is determined to be complete.

In block 870, the pump 130 stops injecting fluid into the wellbore 104. The processing device 160 can transmit a signal to the pump indicating that the hydraulic fracturing process is complete, or the pump 130 can transmit a signal to processing device 160 indicating that the hydraulic fracturing process is complete. The processing device 160 can also instruct the DAS and DTS to cease interrogation of the sensors 120, or change data acquisition parameters to reflect shut-in conditions.

Figure 9:
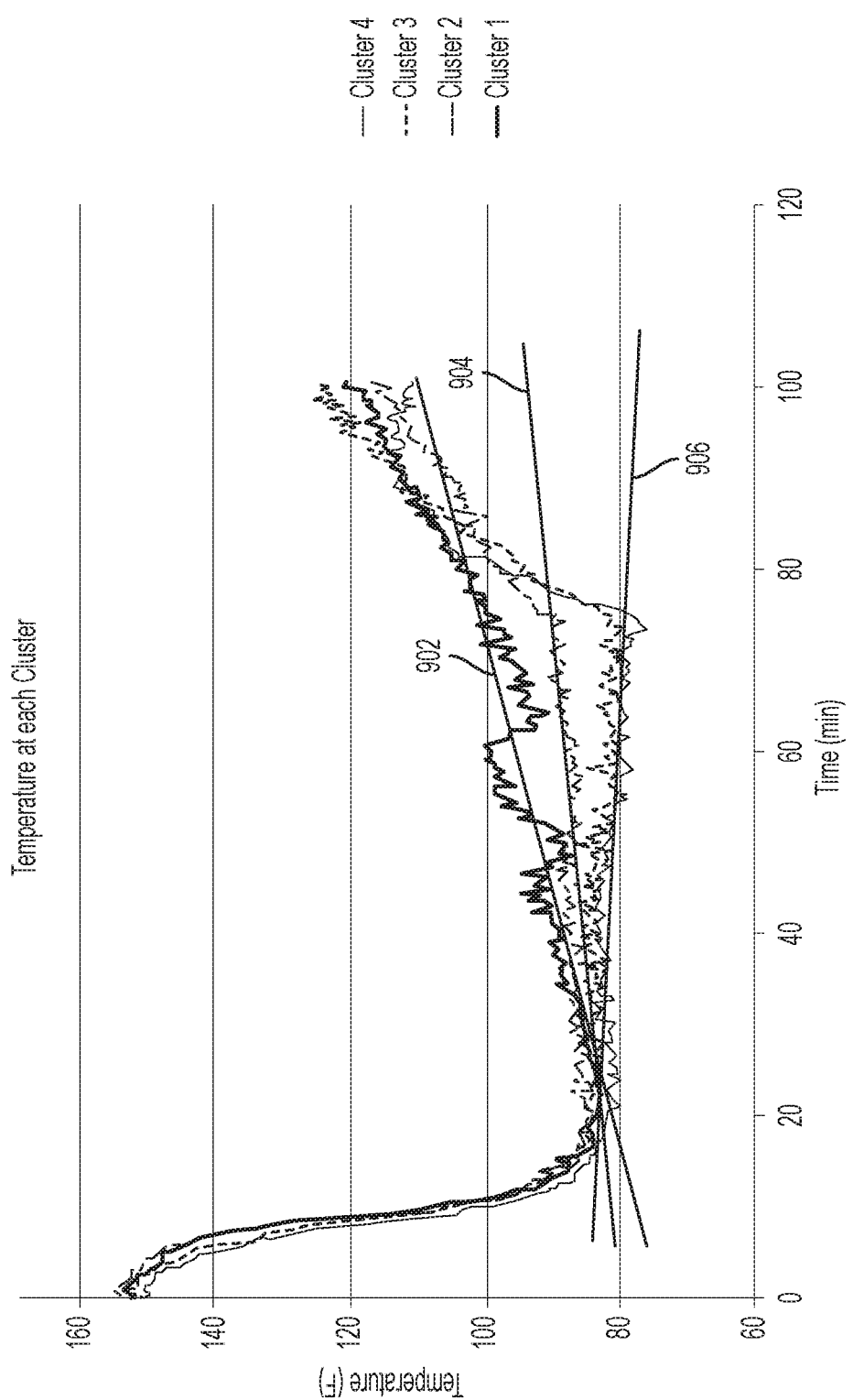
FIG. 9 is a diagram of an example of temperature measurements of each perforation cluster in a well system according to one aspect of the present disclosure.

FIG. 9 illustrates a temperature response at perforation clusters during a hydraulic fracturing process. Temperatures at each of the perforation clusters initially cool down as treatment fluid passes through each of the perforation clusters. Slopes 902, 904 of the temperature response are taken near midway through the hydraulic fracturing process and indicate Cluster 1 and Cluster 2 have started to warm back. Slope 906, determined at the same time as slopes 902, 904 indicates that the temperature of Cluster 3 and temperature of Cluster 4 are declining. Slope 902 is steeper than slope 904 indicating that Cluster 1 has a quicker warm-back than Cluster 2. The temperature response of Clusters 3 and Cluster 4 indicate a warm back approximately 70 minutes after the start of the hydraulic fracturing process.

The early warm back at perforation Cluster 1 and perforation Cluster 2 can indicate a screen-out occurred. While the treatment fluid is passing through the perforation clusters, the perforation clusters can cool. The perforation clusters can begin to warm back as no more fluid passes through the perforation clusters, which can be caused by a screen-out. Cluster 1 may warm back faster than Cluster 2 because Cluster 1 may screen-out sooner than Cluster 2. The warm-back of Clusters 3 and Cluster 4 can occur after the hydraulic fracturing process has ended due to treatment fluid no longer being injected into the wellbore 104.

In some examples, a temperature response can be measured by a DTS to verify the DAS analysis that a screen-out has occurred. A DTS can use the same optical fiber used by the DAS, transmit an optical signal through the optical fiber, and receive backscattered optical signals based on the temperature. But, DTS verification can delay a response to a screen-out as temperature warm back can occurs several minutes after the screen-out occurs. DTS measurements can further delay a response to the screen-out due to the sampling time required to acquire high quality data using a DTS.

In additional or alternative examples, DTS measurements can be used to calibrate a DAS based screen-out detection system to more accurately detect screen-outs. DTS measurements can be used to detect one or more screen-outs in a perforation cluster while a DAS measures data about acoustic signals generated as the treatment fluid passes through the perforation cluster. An expected flow rates of the treatment fluid passing through the perforation cluster can be determined by a processing device based on the data and a change in slope of the expected flow rates can be used to determine a threshold value. The processing device can detect subsequent screen-outs based on a change in slope of expected flow rates exceeding the threshold value.

In some aspects, detecting screen-outs using an acoustic signal is performed according to one or more of the following examples:

Example #1

A method can include receiving, by a processing device, data based on an acoustic signal generated during a hydraulic fracturing operation in a wellbore formed through a subterranean formation. The method can further include determining, by the processing device, an expected total flow rate of fluid being injected into the wellbore based on the data. The method can further include determining, by the processing device, an actual total flow rate of the fluid being injected into the wellbore. The method can further include identifying, by the processing device, that a screen-out occurred by comparing the expected total flow rate and the actual total flow rate.

Example #2

The method of Example #1, can further include determining, by the processing device, flow rates of the fluid through a perforation in the subterranean formation based on the data. The method can further include determining, by the processing device, that the screen-out occurred at the perforation based on a change in the slope of the flow rates of the fluid through the perforation.

Example #3

The method of Example #2, can feature determining that the screen-out occurred at the perforation including determining that the change in the slope is from a positive slope to a negative slope and that the difference in a magnitude of the positive slope and a magnitude of the negative slope exceeding a threshold value.

Example #4

The method of Example #3, can feature determining that the screen-out occurred at the perforation further includes detecting one or more additional screen-outs using a distributed temperature sensing system. Determining that the screen-out occurred at the perforation can further include determining the threshold value based on a change in slope of the flow rate during the one or more additional screen-outs.

Example #5

The method of Example #1, can feature receiving the data based on the acoustic signal including receiving the data from a distributed acoustic sensing system for measuring acoustic signals or thermal signals generated in the wellbore substantially contemporaneously with the acoustic signals being generated.

Example #6

The method of Example #1, can further include causing, by the processing device, a pump communicatively coupled to the processing device to adjust a parameter of the hydraulic fracturing operation based on determining that the screen-out occurred.

Example #7

The method of Example #1, can feature determining the actual total flow rate of the fluid being injected into the wellbore including receiving additional data based on an additional acoustic signal generated at a surface of the wellbore.

Example #8

A system can include a processing device and a memory device. Instructions can be stored on the memory device for causing the processing device to receive data based on an acoustic signal generated during a hydraulic fracturing operation in a wellbore formed through a subterranean formation. The instructions can further cause the processing device to determine an expected total flow rate of fluid being injected into the wellbore based on the data. The instructions can further cause the processing device to determine an actual total flow rate of the fluid being injected into the wellbore. The instructions can further cause the processing device to identify that a screen-out occurred by comparing the expected total flow rate and the actual total flow rate.

Example #9

The system of Example #8, can further include instructions for causing the processing device to determine flow rates of the fluid through a perforation in the subterranean formation based on the data. The instructions can further cause the processing device to determine that the screen-out occurred at the perforation based on a change in the slope of the flow rates of the fluid through the perforation.

Example #10

The system of Example #9, can feature causing the processing device to determine that the screen-out occurred at the perforation including determining that the change in the slope is from a positive slope to a negative slope and that the difference in a magnitude of the positive slope and a magnitude of the negative slope exceeding a threshold value.

Example #11

The system of Example #10, can further include a distributed temperature sensing system communicatively coupled to the processing device. The system can further feature causing the processing device to determine that the screen-out occurred at the perforation further including detecting one or more additional screen-outs using the distributed temperature sensing system. Causing the processing device to determine that the screen-out occurred at the perforation can further include determining the threshold value based on a change in slope of the flow rate during the one or more additional screen-outs.

Example #12

The system of Example #8, can further include a distributed acoustic sensing system communicatively coupled to the processing device. The distributed acoustic sensing system can include an optical fiber, an optical source, and an optical receiver. The optical fiber can extend into the wellbore. The optical source can transmit an optical signal downhole through the optical fiber. The optical receiver can receive a backscattered optical signal formed based on the optical signal responding to acoustic signals generated by the fluid in the wellbore. The system can feature causing the processing device to receive the data including receiving the data from the distributed acoustic sensing system.

Example #13

The system of Example #12, can feature determining the actual total flow rate of the fluid being injected into the wellbore is being based on the data from additional acoustic signals generated at a surface of the wellbore.

Example #14

The system of Example #8, can further include a pump communicatively coupled to the processing device. The system can further include instructions for causing the pump to adjust a type of the fluid being used in the hydraulic fracturing operation based on the processing device determining that the screen-out occurred.

Example #15

A non-transitory computer-readable medium can have instructions stored thereon that can be executed by a processing device for causing the processing device to receive data based on an acoustic signal generated during a hydraulic fracturing operation in a wellbore formed through a subterranean formation. The instructions can be executed for further causing the processing device to determine flow rates of a fluid through a perforation in the subterranean formation based on the data. The instructions can be executed for further causing the processing device to determine that a screen-out occurred at the perforation based on a change in the slope of the flow rates of the fluid through the perforation.

Example #16

The non-transitory computer-readable medium of Example #:15, can further include instructions that can be executed by the processing device for causing the processing device to determine an expected total flow rate of the fluid being injected into the wellbore based on the data. The instructions can be executed for further causing the processing device to determine an actual total flow rate of the fluid being injected into the wellbore. The instructions can be executed for further causing the processing device to identify that the screen-out occurred by comparing the expected total flow rate and the actual total flow rate.

Example #17

The non-transitory computer-readable medium of Example #15, can feature causing the processing device to determine that the screen-out occurred at the perforation including determining that the change in the slope is from a positive slope to a negative slope and determining that the difference in a magnitude of the positive slope and a magnitude of the negative slope exceeds a threshold value.

Example #18

The non-transitory computer-readable medium of Example #17, can feature causing the processing device to determine that the screen-out occurred at the perforation further including detecting one or more additional screen-outs using a distributed temperature sensing system. Causing the processing device to determine that the screen-out occurred at the perforation can further include determining the threshold value based on a change in slope of the flow rate during the one or more additional screen-outs.

Example #19

The non-transitory computer-readable medium of Example #15, can feature causing the processing device to receive the data including receiving the data from a distributed acoustic sensing system communicatively coupled to the processing device for measuring acoustic signals generated in the wellbore substantially contemporaneously with the acoustic signals being generated.

Example #20

The non-transitory computer-readable medium of Example #15, can further include instructions that can be executed for causing a pump communicatively coupled to the processing device to inject a diverter fluid into the wellbore based on the processing device determining that the screen-out occurred.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
receiving, by a processing device, data based on an acoustic signal generated during a hydraulic fracturing operation in a wellbore formed through a subterranean formation;
determining, by the processing device, an expected total flow rate of fluid being injected into the wellbore based on the data;
determining, by the processing device, an actual total flow rate of the fluid being injected into the wellbore;
identifying, by the processing device, an occurrence of a screen-out by comparing the expected total flow rate and the actual total flow rate;
determining, by the processing device, flow rates of the fluid through a perforation in the subterranean formation based on the data; and
determining, by the processing device, the occurrence of the screen-out at the perforation based on a change in a slope of the flow rates of the fluid through the perforation.

2. The method of claim 1, wherein determining that the occurrence of the screen-out at the perforation comprises determining that the change in the slope is from a positive slope to a negative slope and that a difference in a magnitude of the positive slope and a magnitude of the negative slope exceeding a threshold value.

3. The method of claim 2, wherein determining that the screen-out occurred at the perforation further comprises:
detecting one or more additional screen-outs using a distributed temperature sensing system; and
determining the threshold value based on a change in slope of the flow rate during the one or more additional screen-outs.

4. The method of claim 1, wherein receiving the data based on the acoustic signal comprises receiving the data from a distributed acoustic sensing system for measuring acoustic signals or thermal signals generated in the wellbore substantially contemporaneously with the acoustic signals being generated.

5. The method of claim 4, further comprising:
calibrating the distributed acoustic sensing system for screen-out detection using distributed temperature sensing measurements.

6. The method of claim 1, further comprising causing, by the processing device, a pump communicatively coupled to the processing device to adjust a parameter of the hydraulic fracturing operation based on determining that the screen-out occurred.

7. The method of claim 1, wherein determining the actual total flow rate of the fluid being injected into the wellbore comprises receiving additional data based on an additional acoustic signal generated at a surface of the wellbore.

8. A system comprising:
a processing device; and
a memory device on which instructions are stored for causing the processing device to:
receive data based on an acoustic signal generated during a hydraulic fracturing operation in a wellbore formed through a subterranean formation;
determine an expected total flow rate of fluid being injected into the wellbore based on the data;
determine an actual total flow rate of the fluid being injected into the wellbore;
identify an occurrence of a screen-out by comparing the expected total flow rate and the actual total flow rate;
determine flow rates of the fluid through a perforation in the subterranean formation based on the data; and
determine that the screen-out occurred at the perforation based on a change in a slope of the flow rates of the fluid through the perforation.

9. The system of claim 8, wherein causing the processing device to determine the occurrence of the screen-out at the perforation comprises determining that the change in the slope is from a positive slope to a negative slope and that a difference in a magnitude of the positive slope and a magnitude of the negative slope exceeding a threshold value.

10. The system of claim 9, the system further including a distributed temperature sensing system communicatively coupled to the processing device, wherein causing the processing device to determine that the screen-out occurred at the perforation further comprises:
detecting one or more additional screen-outs using the distributed temperature sensing system; and
determining the threshold value based on a change in slope of the flow rate during the one or more additional screen-outs.

11. The system of claim 8, further comprising a distributed acoustic sensing system communicatively coupled to the processing device, the distributed acoustic sensing system comprising:
an optical fiber extendable into the wellbore;
an optical source for transmitting an optical signal downhole through the optical fiber; and
an optical receiver for receiving a backscattered optical signal formed based on the optical signal responding to acoustic signals generated by the fluid in the wellbore,
wherein causing the processing device to receive the data comprises receiving the data from the distributed acoustic sensing system.

12. The system of claim 11, wherein determining the actual total flow rate of the fluid being injected into the wellbore is based on the data from additional acoustic signals generated at a surface of the wellbore.

13. The system of claim 8, further comprising a pump communicatively coupled to the processing device, wherein the instructions are further for causing the pump to adjust a type of the fluid being used in the hydraulic fracturing operation based on the processing device determining that the screen-out occurred.

14. A non-transitory computer-readable medium in which instructions executable by a processing device are stored for causing the processing device to:
receive data based on an acoustic signal generated during a hydraulic fracturing operation in a wellbore formed through a subterranean formation;
determine flow rates of a fluid through a perforation in the subterranean formation based on the data; and
determine an occurrence of a screen-out at the perforation based on a change in a slope of the flow rates of the fluid through the perforation.

15. The non-transitory computer-readable medium of claim 14, wherein the instructions are further executable by the processing device for causing the processing device to:
determine an expected total flow rate of the fluid being injected into the wellbore based on the data;
determine an actual total flow rate of the fluid being injected into the wellbore; and
identify the occurrence of the screen-out by comparing the expected total flow rate and the actual total flow rate.

16. The non-transitory computer-readable medium of claim 14, wherein causing the processing device to determine that the screen-out occurred at the perforation comprises determining that the change in the slope is from a positive slope to a negative slope and determining that a difference in a magnitude of the positive slope and a magnitude of the negative slope exceeds a threshold value.

17. The non-transitory computer-readable medium of claim 16, wherein causing the processing device to determine that the screen-out occurred at the perforation further comprises:
  detecting one or more additional screen-outs using a distributed temperature sensing system; and
  determining the threshold value based on a change in slope of the flow rate during the one or more additional screen-outs.

18. The non-transitory computer-readable medium of claim 14, wherein causing the processing device to receive the data comprises receiving the data from a distributed acoustic sensing system communicatively coupled to the processing device for measuring acoustic signals generated in the wellbore substantially contemporaneously with the acoustic signals being generated.

19. The non-transitory computer-readable medium of claim 18, wherein the instructions are further executable by the processing device for causing the processing device to:
  calibrate the distributed acoustic sensing system for screen-out detection using distributed temperature sensing measurements.

20. The non-transitory computer-readable medium of claim 14, wherein the instructions are further executable by the processing device for causing a pump communicatively coupled to the processing device to inject a diverter fluid into the wellbore based on the processing device determining that the screen-out occurred.

* * * * *